Patented Aug. 18, 1953

2,649,381

UNITED STATES PATENT OFFICE 2,649,381

STABILIZED STENCIL INK

Herbert W. Hempel, Belleville, Ill., and Flavian P. Calabrese, St. Louis, Mo., assignors to Marsh Stencil Machine Company, Belleville, Ill., a corporation of Illinois No Drawing. Application August 6, 1949, Serial No. 109,064

3 Claims. (Cl. 106—30)

The present invention relates to a stabilized pigment ink, and particularly to a stencil ink that can be used for making stencils, that will produce a black and solid color, and that will not produce sedimentation and settling out of the heavier particles in suspension when it is left standing during the usual periods of non-use.

Especial features of the invention will appear from the description to follow, which also discloses the composition of the ink and the process of compounding it, so that a stencil ink of desired characteristic will be obtained.

In the preferred method of making the ink of this invention, a thin solution of asphaltum and Stanolex is prepared. A desirable mixture is two gallons of asphaltum and three gallons Stanolex. This gives a satisfactory solution that can be conveniently poured into a conventional paste mixer such as a dough mixer. Under certain circumstances, the ratio of Stanolex to asphaltum may be varied. For example, when a different type of mixer, such as a ball mill, is used the amount of Stanolex may be greater at this stage.

After the asphaltum and Stanolex are duly poured in the mixer, the following products are then added to the solution in the mixer: 5 gallons of gloss oil, 12 more gallons of Stanolex, 3 quarts of L-9-100 lecithin solution.

The last three components are added to the mixer while it is running, and thereafter carbon black is added as by a hopper feed while the mixer is running. The mixing is continued until a smooth heavy paste is obtained.

Thereafter, the paste obtained as aforesaid is passed through a roller mill for a period of time such as twenty minutes until a thorough dispersion of the carbon black is obtained and the paste has an even texture. Thereafter the paste is removed from the roll mill and is dumped into a tank equipped with side baffles and a paddle stirrer in which about 60 gallons of Stanolex is already present. The mixing in the tanks is carried on for about thirty minutes, or until a complete dilution and even suspension is obtained, at the end of which time Stanolex is added gradually to bring the total batch up to about 120 gallons. The final addition of Stanolex is made by pumping it into the mixing tank while the stirrer continues to operate.

The lecithin solution L-9-100 is a soy bean lecithin in V. M. & P. naphtha in the proportion of 5 pounds of lecithin per gallon of solution. The lecithin is added in the amount such that the lecithin is equivalent to 5% of the weight of the carbon black. This gives approximately 3.75 pounds of lecithin to 75 pounds of carbon black, or is 3 quarts of L-9-100 lecithin solution for 120 gallons of ink.

It has been found that an amount of lecithin greater than 5% of the weight of carbon black adds little, if any, benefit to the settling characteristics of the product. Less than 5% is undesirable because the rate of settling of the carbon black in the final product is undesirably increased. The lecithin solution is preferably the one defined, especially as naphtha is readily available as a solvent. However, lecithin in other carriers such as mineral spirits could be used.

Stanolex is a commercial petroleum distillate having a distillation range of about 363–613° F., with an A. P. I. gravity of 36.9 and a flash at 166° F., sold by Standard Oil Company of Indiana.

The gloss oil is a limed rosin, 50% mineral spirits by weight. The carbon black is commercial carbon black.

The asphaltum used is a refined petroleum asphalt dissolved in mineral spirits to a heavy brushing consistency. A suitable asphaltum is one supplied by Trumbull Asphalt Company of Delaware.

The ratio of carbon black is of course subject to variation, depending on the necessities or requirements for a solid black marking. However, the ratio of lecithin is geared to the amount of carbon black used. And, with this mix, a relatively large volume of carbon black may be used without excessive settling, so that a very black mark is obtained.

The gloss oil acts as a drier and also it acts to aid the wetting of the pigment. The amount of gloss oil should be at least about 5 gallons in the formulation given, as otherwise the drying rate is too slow. The percentage may be as much as doubled but anything greater than that tends to stiffen the bristles of any brushes with which the ink is used.

The Stanolex as a carrier has the function not only of obtaining the desired fluidity, but also of obtaining a maximum viscosity factor without an excessively slow rate of drying. In a suspension of the character herein involved, a thin carrier such as kerosene is distinctly less desirable from the standpoint of resisting settling. On the other hand, carriers of greater viscosity such as combinations of kerosene and paraffin oil, although they may be made of viscosity comparable to that of the Stanolex, possess an undesirably slow rate of drying, so that the ink can be smeared at any time within a substantial period after it is applied.

The asphaltum is employed in the preferred composition, as it provides tackiness on the rolls and is a good wetter for the carbon black. It is not absolutely essential to the ink, but is highly desirable. When it is used, its proportion should be about 2 gallons for every 5 to 10 gallons of gloss oil.

What is claimed is:

1. A stencil ink comprising the following products in the indicated ratios: about 2 gallons of asphaltum, about 5-10 gallons of gloss oil, carbon black pigment and soybean lecithin in the ratio of about 5% of the weight of carbon black, and a carrier in an amount at least great enough to provide a paste, said carrier being a petroleum distillate having a distillation range of about 363 to 613° F. and a flash point of 166° F.

2. A stencil ink comprising in ratio about 2 gallons of asphaltum, about 5 gallons of gloss oil, about 3.75 pounds soybean lecithin, about 75 pounds carbon black and enough carrier to produce about 120 gallons as the total batch, said carrier being a petroleum distillate having a distillation range of about 363 to 613° F. and a flash of 166° F.

3. A stencil ink comprising the following products in the indicated ratios: about 5 to 10 gallons of gloss oil, carbon black pigment and soybean lecithin in the ratio of about 5% of the weight of carbon black, and a carrier in an amount at least great enough to provide a paste, said carrier being a petroleum distillate having a distillation range of about 363 to 613° F. and a flash point of 166° F.

HERBERT W. HEMPEL.
FLAVIAN P. CALABRESE.

References Cited in the file of this patent

UNITED STATES PATENTS

| Number | Name | Date |
|---|---|---|
| 1,096,198 | Schutze | May 12, 1914 |
| 2,067,234 | Gordon | Jan. 12, 1937 |
| 2,069,187 | Kraybill | Jan. 26, 1937 |
| 2,236,521 | Coleman | Apr. 1, 1941 |
| 2,351,585 | Breyer | June 20, 1944 |
| 2,390,390 | Rietz | Dec. 4, 1945 |
| 2,482,879 | Schmutzler | Sept. 27, 1949 |

FOREIGN PATENTS

| Number | Country | Date |
|---|---|---|
| 13,145 | Great Britain | 1900 |
| 293,238 | Great Britain | July 5, 1928 |

OTHER REFERENCES

Gregory, "Uses and Applications of Chemical and Related Materials," vol. II (1944), pp. 185 and 186.